(No Model.)

H. B. IVINS & A. B. DUNPHEY.
CORN STUBBLE CUTTER.

No. 534,266. Patented Feb. 19, 1895.

UNITED STATES PATENT OFFICE.

HARRY B. IVINS, OF MEDFORD, AND AUBREY G. DUNPHEY, OF MARLTON, NEW JERSEY.

CORN-STUBBLE CUTTER.

SPECIFICATION forming part of Letters Patent No. 534,266, dated February 19, 1895.

Application filed October 30, 1894. Serial No. 527,461. (No model.)

*To all whom it may concern:*

Be it known that we, HARRY B. IVINS, residing at Medford, and AUBREY G. DUNPHEY, residing at Marlton, in the county of Burlington, State of New Jersey, citizens of the United States, have invented certain new and useful Improvements in Corn-Stubble Cutters; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to those corn stubble cutters carried on wheels, and provided with stubble cutting knives disposed before harrowing and cutting devices.

The object of our invention is to provide a stubble cutting machine of more simple and durable construction and whose parts can be easily and quickly manipulated.

A further object of our invention is to provide a peculiarly constructed stubble knife and to employ in connection therewith a series of adjustable clod cutters so disposed as to more effectually cut and break up the roots of the stubble, and at the same time level the corn hill so that the ground will be thoroughly harrowed and left in excellent condition after the machine has passed over it. To accomplish this purpose we employ those peculiar features and combinations of parts more fully described hereinafter and pointed out in the claims.

Figure 1:
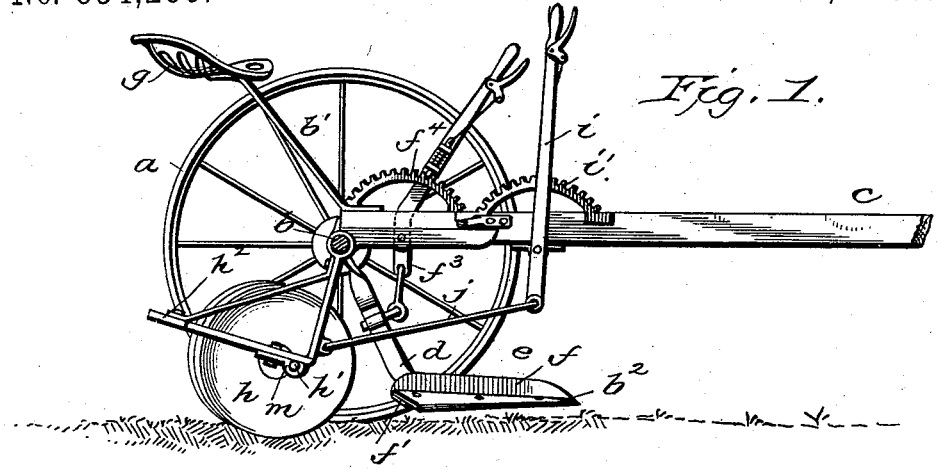
Figure 2:
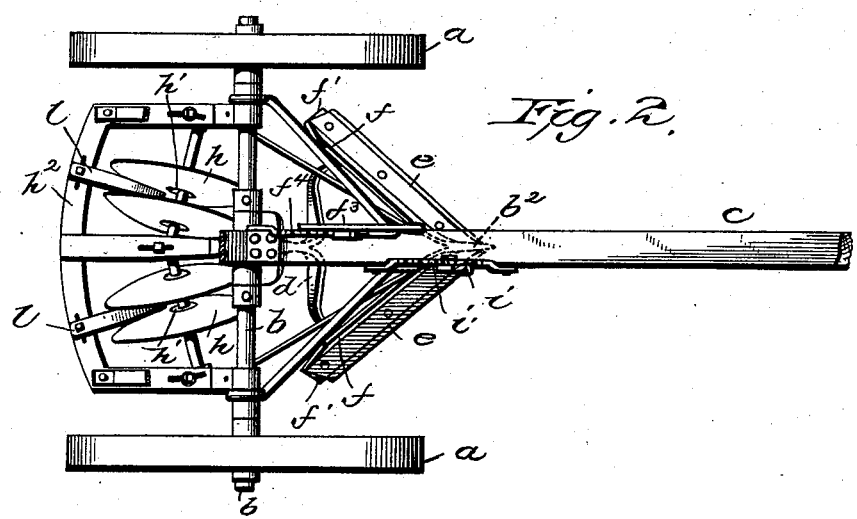
Figure 3:
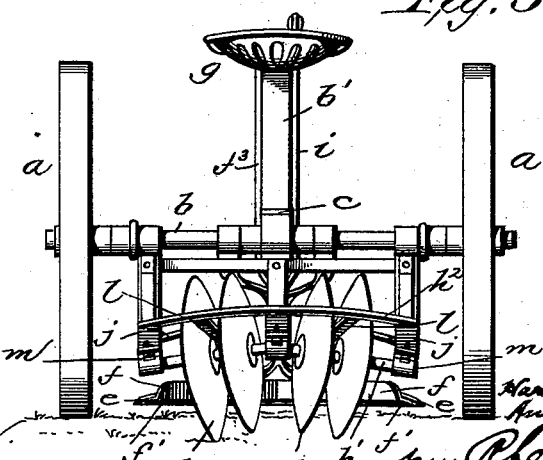

In the accompanying drawings: Figure 1, represents a side elevation of our complete invention; Fig. 2, a top view, and Fig. 3, a rear elevation thereof.

The reference letter $a$ denotes an ordinary pair of traction wheels mounted on an axle $b$, provided with the usual tongue $c$, these parts forming, as it were, the sulky which carries the cutting and harrowing mechanism. Suspended from the axle $b$ by means of a hanger $d$ is a substantially V-shaped cutting knife $e$ having its pointed portions extending toward the front of the machine. This knife comprises a pair of flaring wings $f$, the lower flanges $f'$ of which are given a gradual downward and outward slope, and their outer edges are sharpened to move over the ground and shave the stubble off close to the roots. The forward end or nose $b^2$, of the knife is made sufficiently sharp to brush the stubble to its right or left as it passes along and direct the stubble to the action of the cutting edges. This knife can be raised or lowered and thereby be thrown in or out of use by means of a hand lever $f^3$ fulcrumed on the tongue in front of the axle, and it can be held in any desired position by means of the usual pawl and ratchet mechanism $f^4$. The seat $g$ is secured to the rear end of the tongue by means of a rearwardly extending bar $b'$. Beneath the seat and following behind the knife $e$ is a series of disks $h$, mounted upon obliquely disposed shafts $h'$ which shafts are in turn mounted in a frame $h^2$ pivotally suspended from the axle $b$. This frame and hence the knives can be raised and lowered by means of a lever $i$, fulcrumed on the tongue and locked at different adjustments by pawl and ratchet devices $i'$. The lower end of the lever is connected with the frame $h^2$ by means of rods $j$. The disk shafts besides being disposed obliquely to the direction in which the machine moves, also extend upward toward the center of the machine thereby giving the disks a slight inclination from their true vertical position with their lower ends converging toward each other. The disks are spaced apart at equal distances at their converging edges and each disk is slightly dished, the degree of "dish" being important to the successful operation of the machine. Intervening fingers $l$ are attached to the disk frame and keep them clear from the accumulation of matter during their operation.

The shafts on which the disks are mounted are also rendered capable of adjustment for the purpose of regulating their angle of inclination, by means of adjustable boxes $m$, attached to the under side of the frame, the boxes in the contiguous ends of the shafts being constructed to permit of such adjustment.

Thus constructed the operation of our invention is as follows: The wheels are placed astride a row of corn stubble and so that the point of the knife will be in line therewith. As the machine advances the knife will pass on one side or the other of the stubble and shave it off close to the roots. After the knife has passed over and left the roots and cut stubble behind, the series of disks follow and cut the roots and stalks, and at the same time levels and harrows the ground and leaves it in condition for planting or further treatment. The inclined adjustment of the rotary disks has the effect of throwing the earth laterally and turning it over to more effectually cultivate the soil, and they can be adjusted up and down in relation to the ground, to any desired extent by the manipulation of the hand lever in front of the driver.

Having thus described our invention, what we claim as new, and desire to secure by Letters Patent, is—

1. In a corn stubble cutter, the combination with the supporting wheels and their axle, of a V-shaped knife pivotally suspended from the axle, said knife having its points extending forward, in combination with a pivotally suspended frame carrying obliquely disposed disks, and means substantially as described, for raising and lowering the knife and disks.

2. In a corn stubble cutter, the combination of a substantially V-shaped and horizontally disposed knife, in combination with a pivotally suspended frame provided with obliquely disposed rotary disks, substantially as described.

3. In combination with wheels and their axles, a stubble cutting knife adjustably suspended therefrom, in combination with a series of disks or clod cutters having oblique axes provided with cleaning fingers extending between the disks, in the manner and for the purpose substantially as described.

4. In combination with traction wheels and their axle, a corn stubble cutting knife having diverging cutting edges, in combination with an adjustable frame provided with obliquely disposed rotary disks.

5. In a corn stubble cutter, the combination with a horizontally disposed cutting knife, having blades converging toward the front of the machine, with an adjustable frame pivotally suspended to the wheel axle and provided with a series of concavo-convex disks having their vortexes facing each other, substantially as described.

6. In combination with a fore-running stubble cutting knife, a pivotally suspended adjustable frame, provided with obliquely disposed rotary cutting disks the lower ends of which converge to a common center, substantially as described.

In witness whereof we affix our signatures in presence of two witnesses.

HARRY B. IVINS.
AUBREY G. DUNPHEY.

Witnesses:
RHESA G. DU BOIS,
GEO. R. HAMLIN.